United States Patent
Kaarto et al.

(10) Patent No.: US 12,187,880 B2
(45) Date of Patent: Jan. 7, 2025

(54) POLYPROPYLENE POLYMER COMPOSITION HAVING HIGH STIFFNESS PROPERTIES

(71) Applicant: W. R. GRACE & CO.-CONN, Columbia, MD (US)

(72) Inventors: John Kaarto, Columbia, MD (US); Jing Zhong, Columbia, MD (US); Amaia Montoya-Goni, Columbia, MD (US)

(73) Assignee: W.R. GRACE & CO.-CONN, Columbia, MD (US)

( * ) Notice: Subject to any disclaimer, the term of this patent is extended or adjusted under 35 U.S.C. 154(b) by 614 days.

(21) Appl. No.: 17/594,174

(22) PCT Filed: Apr. 3, 2020

(86) PCT No.: PCT/US2020/026548
§ 371 (c)(1),
(2) Date: Oct. 5, 2021

(87) PCT Pub. No.: WO2020/206229
PCT Pub. Date: Oct. 8, 2020

(65) Prior Publication Data
US 2022/0177682 A1 Jun. 9, 2022

Related U.S. Application Data

(60) Provisional application No. 62/830,007, filed on Apr. 5, 2019.

(51) Int. Cl.
*C08L 23/12* (2006.01)
*C08F 110/06* (2006.01)
*C08L 23/14* (2006.01)

(52) U.S. Cl.
CPC ............. *C08L 23/12* (2013.01); *C08F 110/06* (2013.01); *C08F 2500/30* (2021.01); *C08F 2500/35* (2021.01); *C08L 23/14* (2013.01); *C08L 2205/025* (2013.01); *C08L 2205/24* (2013.01); *C08L 2314/02* (2013.01)

(58) Field of Classification Search
CPC .......... C08L 23/12; C08L 23/16; C08L 23/14; C08L 23/142; C08L 2205/025; C08F 110/06; C08F 10/06; C08F 210/06; C08F 210/16; C08F 2500/35; C08F 2500/30
See application file for complete search history.

(56) References Cited

U.S. PATENT DOCUMENTS

| | | | |
|---|---|---|---|
| 9,187,586 B2* | 11/2015 | Forgue | B29C 51/002 |
| 9,255,166 B2* | 2/2016 | Grein | C08F 210/06 |
| 9,273,167 B2* | 3/2016 | Sandholzer | C08F 210/06 |
| 9,309,394 B2* | 4/2016 | Ciarafoni | C08L 23/10 |
| 9,353,252 B2* | 5/2016 | Gahleitner | C08J 5/18 |
| 9,809,666 B2* | 11/2017 | Hedesiu | C08J 5/00 |
| 10,160,849 B1* | 12/2018 | Cavalieri | C08L 23/12 |
| 10,308,795 B2* | 6/2019 | Wang | C08F 4/651 |
| 10,501,615 B2* | 12/2019 | Standaert | C08L 23/12 |
| 10,961,376 B2* | 3/2021 | Hedesiu | F16L 9/12 |
| 11,111,369 B2* | 9/2021 | Kahlen | C08L 23/16 |
| 11,254,811 B2* | 2/2022 | Aarnio-Winterhof | C08F 210/06 |
| 11,453,767 B2* | 9/2022 | Mei | C08L 23/06 |
| 11,752,743 B2* | 9/2023 | Wang | B32B 27/08 428/35.7 |
| 2006/0047071 A1 | 3/2006 | Pelliconi et al. | |
| 2009/0209706 A1 | 8/2009 | Sheard et al. | |
| 2015/0299442 A1* | 10/2015 | Horill | C08L 23/16 524/451 |
| 2016/0152812 A1 | 6/2016 | Glogovsky et al. | |
| 2018/0179371 A1* | 6/2018 | Cavalieri | C08L 23/12 |
| 2018/0362746 A1* | 12/2018 | Wang | C08L 23/12 |
| 2021/0147666 A1* | 5/2021 | Inepekoglou | C08F 210/06 |

FOREIGN PATENT DOCUMENTS

| | | |
|---|---|---|
| EP | 0 412 534 A2 | 2/1991 |
| EP | 0 412 534 B1 | 2/1991 |
| EP | 2 657 285 A1 | 10/2013 |
| EP | 2 787 034 A1 | 10/2014 |
| EP | 2 865 713 A1 | 4/2015 |
| EP | 2 865 713 B1 | 4/2015 |
| JP | 2002-294010 | 10/2002 |

(Continued)

OTHER PUBLICATIONS

Foreign Action other than Search Report on JP 2021-557664, dated Jan. 10, 2024, 4 pages.
Examination Report on EP 20782901.1 Dtd Feb. 29, 2024.
Examination Report on KW/P/2021/000396 dated Apr. 23, 2024.
Hearing Notice for IN Patent Application No. 202117044177 dated Mar. 18, 2024.
Examination Report from India Patent Application No. 2021170441177 dated Jul. 19, 2023, 5 pages.
Foreign Office Action and ISR on RU patent application No. 2021130289 dated Sep. 26, 2023 (22 pages).

(Continued)

*Primary Examiner* — Rip A Lee
(74) *Attorney, Agent, or Firm* — DORITY & MANNING, P.A

(57) ABSTRACT

Polypropylene polymer compositions are disclosed that have excellent stiffness properties. The polypropylene polymer compositions are made by combining a first polypropylene polymer with a second polypropylene polymer. The combination of polymers has been found to produce a composition having high stiffness properties in addition to excellent toughness properties. In addition, the polymer composition has good flow properties for being molded into various products and articles. Of particular advantage, the different polypropylene polymers can be produced at relatively high catalyst activity, especially in comparison to high crystalline polymers made in the past.

17 Claims, 1 Drawing Sheet

(56) References Cited

FOREIGN PATENT DOCUMENTS

| | | | |
|---|---|---|---|
| JP | 2003-509562 | 3/2003 | |
| JP | 2016-535802 | 11/2016 | |
| JP | 2018-135419 | 8/2018 | |
| JP | 2018-531888 | 11/2018 | |
| RU | 2626394 C2 | 7/2017 | |
| WO | WO-01/19915 A1 | 3/2001 | |
| WO | WO-2012/171745 A1 | 12/2012 | |
| WO | WO 2016/050461 A1 * | 4/2016 | ............. C08L 23/12 |
| WO | 2017/206043 A1 | 12/2017 | |
| WO | WO-2018/077854 A1 | 5/2018 | |
| WO | WO-2019/002345 A1 | 1/2019 | |

OTHER PUBLICATIONS

EESR on EP patent application No. 20782901.1 dated Nov. 14, 2022 (7 pages).
Foreign Office Action on RU patent application No. 2021130289 dated Nov. 30, 2021 (5 pages).

* cited by examiner

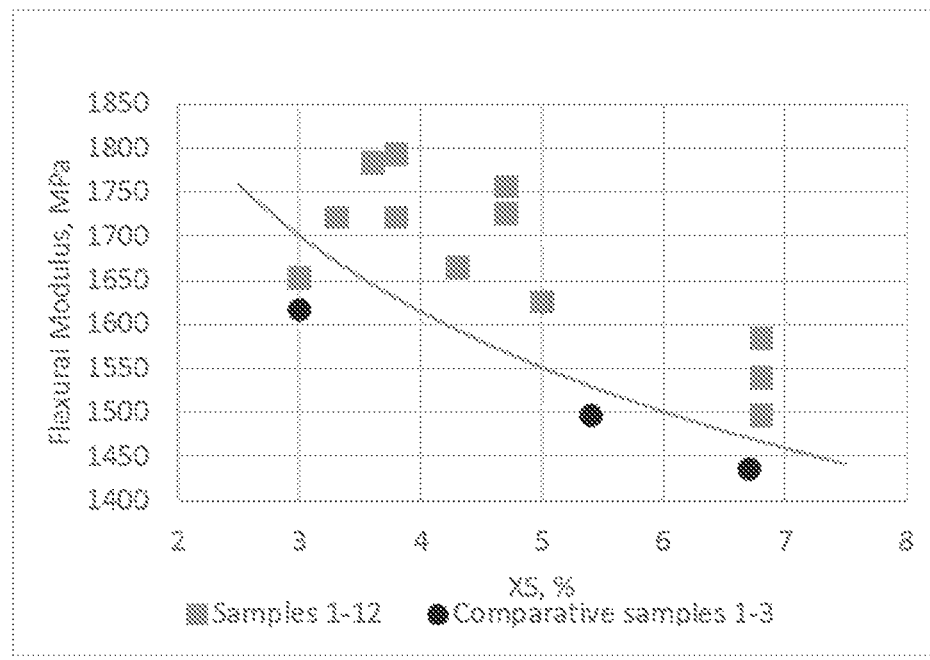

POLYPROPYLENE POLYMER COMPOSITION HAVING HIGH STIFFNESS PROPERTIES

RELATED APPLICATIONS

The present application is based on and claims priority to U.S. Provisional Patent application Ser. No. 62/830,007, filed on Apr. 5, 2019, which is incorporated herein by reference.

BACKGROUND

One important property of many polymer materials is stiffness. Stiffness refers to the rigidity characteristics of the material and can be measured by determining the flexural modulus of the material. Flexural modulus relates to the ability of the material to bend or, in other words, its resistance to bending when a force is applied perpendicular to a molded plaque formed from the polymer.

Polymers made with increased stiffness offer various advantages when molded into products and articles. High stiffness polymers, for instance, generally do not deform when subjected to exterior forces. Thus, freestanding and shape retaining products can be made from high stiffness polymers. For example, increasing the stiffness of a polymer can translate into minimizing the wall thickness of various polymer articles, such as containers, while still having sufficient rigidity and shape conforming properties.

In the past, various efforts have been undertaken in order to increase the stiffness of polypropylene polymers. For example, in the past, the stiffness of polypropylene polymers was increased by increasing the crystallinity of the material. Increasing the crystallinity of the material provided the desired increase in stiffness. Various problems, however, were encountered.

For example, increasing the crystallinity of the polypropylene polymer can reduce the toughness of the polymer and result in brittleness of the final product. In addition, high crystalline polypropylene can be somewhat difficult to process. Increasing the crystallinity of the polypropylene polymer, for instance, can shorten the operating window for melt processing the polymer which increases the difficulty in forming products.

Further, high crystalline polypropylene can be somewhat expensive to produce. Increasing the crystallinity of the polymer, for instance, can decrease the effectiveness of the catalyst used to produce the polymer. For example, Ziegler-Natta catalysts decrease in catalyst activity as the crystallinity of the polymer is increased. Consequently, greater amounts of catalysts are needed to produce the polymer which can greatly increase the cost of making the polymer.

In view of the above, a need exists for a polypropylene polymer composition that has relatively high stiffness properties and high toughness properties. A need also exists for a process for producing a polypropylene polymer composition having high stiffness properties without decreasing catalyst activity.

SUMMARY

In general, the present disclosure is directed to a polypropylene polymer composition having relatively high stiffness properties. The polymer composition of the present disclosure can be produced without sacrificing catalyst activity and with a broad molecular weight distribution. The broad molecular weight distribution improves the processability of the composition.

In one embodiment, the present disclosure is directed to a polypropylene polymer composition comprising a first polypropylene polymer combined with a second polypropylene polymer. The first polypropylene polymer has a melt flow rate of greater than about 0.1 g/10 min and less than about 3 g/10 min. The first polypropylene polymer has a xylene soluble content of greater than about 1%, such as greater than about 2.5%, such as greater than about 3%, such as greater than about 3.5%, and generally less than about 8%, such as less than about 7% by weight. In one aspect, the xylene soluble content is greater than about 5% by weight, such as greater than about 6% by weight. In another aspect, the xylene soluble content is less than about 4% by weight. The first polypropylene polymer can have a polydispersity index of generally greater than about 4 and less than about 10.

The second polypropylene polymer that is added to the first polypropylene polymer can have a melt flow rate of greater than about 5 g/10 min and less than about 100 g/10 min. The second polypropylene polymer can have a xylene soluble content of greater than about 1%, such as greater than about 2.5%, such as greater than about 3%, such as greater than about 4%, and generally less than about 8%, such as less than about 7% by weight. The second polypropylene polymer can have a polydispersity index of greater than about 4 and less than about 5.5.

In one aspect, one of the polypropylene polymers has a xylene soluble content of greater than about 5% by weight, such as greater than about 6% by weight and the other polypropylene polymer has a xylene soluble content of less than about 4% by weight.

The first polypropylene polymer can be present in the polypropylene polymer composition in relation to the second polypropylene polymer at a weight ratio of from about 5:95 to about 80:20, such as from about 30:70 to about 67:33. In one particular embodiment, the first low melt flow rate polypropylene polymer is present in an amount less than the second polypropylene polymer. For instance, in one embodiment, the weight ratio of the first polypropylene polymer to the second polypropylene polymer can be from about 5:95 to about 45:55. The overall polypropylene polymer composition can generally have a melt flow rate of greater than about 0.5 g/10 min, such as greater than about 0.7 g/10 min, such as greater than about 1 g/10 min, and generally less than about 30 g/10 min, such as less than about 25 g/10 min, such as less than about 20 g/10 min. In one embodiment, for instance, the melt flow rate can be from about 0.5 g/10 min to about 3 g/10 min. In an alternative embodiment, the melt flow rate can be from about 5 g/10 min to about 20 g/10 min.

The polypropylene polymer composition can have a total xylene soluble content of generally greater than about 3%, such as greater than about 3.5%, such as greater than about 4%, and generally less than about 8%, such as less than about 7%, such as less than about 6.8% by weight. The polypropylene polymer composition can have an overall polydispersity index of greater than about 5 and less than about 10.

As described above, the polypropylene polymer composition of the present disclosure has relatively high stiffness properties. For example, the polypropylene polymer composition can have a flexural modulus (ASTM Test D790) according to the following equation: wherein XS is the xylene soluble content of the polypropylene polymer composition, and wherein the xylene soluble content of the polypropylene polymer composition can be from about 2.5% to about 8% by weight.

For example, the polypropylene polymer composition of the present disclosure can have a flexural modulus of greater than about 1500 MPa, such as greater than about 1550 MPa, such as greater than about 1600 MPa, such as greater than about 1650 MPa, such as greater than about 1700 MPa, and generally less than about 2500 MPa. In addition to having excellent stiffness properties, the polypropylene polymer composition can also display an IZOD impact resistance of greater than about 40 J/m, such as greater than about 45 J/m, such as greater than about 55 J/m, and generally less than about 90 J/m.

In one embodiment, the first polypropylene polymer and the second polypropylene polymer can both comprise polypropylene homopolymers. In an alternative embodiment, at least one of the polypropylene polymers can be a copolymer, such as a copolymer containing ethylene units.

The polypropylene polymer composition of the present disclosure can, in one embodiment, be formed in a process in which a propylene polymer is polymerized in the presence of a non-phthalate, Ziegler-Natta catalyst. The Ziegler-Natta catalyst can have a catalyst activity of greater than about 50 kg/g to produce the polypropylene polymer composition. The polypropylene polymers can be produced in a gas phase reactor or in a bulk phase reactor. In one embodiment, each of the first and second polypropylene polymers are formed in separate processes and then combined. Alternatively, the first polypropylene polymer and the second polypropylene polymer can be formed sequentially in a series of reactors.

The polypropylene polymer composition of the present disclosure can be used to form all different types of molded articles. In one embodiment, the polymer composition can be used to produce all different types of molded articles using any suitable thermoforming process or molding process. For example, articles can be produced using extrusion blow molding, injection molding, rotational molding, extrusion, and the like. The polypropylene polymer composition can also be used to produce biaxially oriented polypropylene films. Articles that may be made in accordance with the present disclosure include storage or packaging containers, such as food containers.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a graphical representation of the results obtained in the example below.

Repeat use of reference characters in the present specification and drawings is intended to represent the same or analogous features or elements of the present invention.

DEFINITIONS AND TESTING PROCEDURES

The term "polypropylene homopolymer", as used herein, is a homopolymer containing propylene monomer units.

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP—R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-06 using a 90 minute precipitation time and is also referred to herein as the "wet method". XS can also be measured according to the Viscotek method, as follows: 0.4 g of polymer is dissolved in 20 ml of xylenes with stirring at 130° C. for 60 minutes. The solution is then cooled to 25° C. and after 60 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PolyCAL™ polystyrene standards. A polypropylene (PP) homopolymer, such as biaxially oriented polypropylene (BOPP) grade Dow 5D98, is used as a reference material to ensure that the Viscotek instrument and sample preparation procedures provide consistent results by using the polypropylene homopolymer, such as 5D98, as a control to check method performance. The value for the reference polypropylene homopolymer, such as 5D98, is initially derived from testing using the ASTM method identified above.

The ASTM D5492-06 method mentioned above may be adapted to determine the xylene soluble portion. In general, the procedure consists of weighing 2 g of sample and dissolving the sample in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=[($m_3 - m_2$)*2/$m_1$]*100, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

Ethylene content is measured using a Fourier Transform Infrared method (FTIR) which is correlated to ethylene values determined using $^{13}$C NMR as the primary method. The relationship and agreement between measurements conducted using the two methods is described in, e.g., J. R. Paxson, J. C. Randall, "Quantitative Measurement of Ethylene Incorporation into Propylene Copolymers by Carbon- 13 Nuclear Magnetic Resonance and Infrared Spectroscopy", Analytical Chemistry, Vol. 50, No. 13, November 1978, 1777-1780.

Flexural modulus is determined in accordance with ASTM D790-10 Method A at 1.3 mm/min, using a Type 1 specimen per ASTM 3641 and molded according to ASTM D4101.

Polydispersity index is measured by small amplitude oscillatory shear (SAOS). The test is carried out using ARES G2 (TA instrument) which is a stress control dynamic spectrometer manufactured by TA Instruments using a method according to Zeichner G R, Patel P D (1981) "A comprehensive Study of Polypropylene Melt Rheology" Proc. Of the World Congress of Chemical Eng., Montreal, Canada. An ETC oven is used to control the temperature at 180° C.±0.1° C. Nitrogen is used to purge the inside the oven to keep the sample from degradation by oxygen and moisture. The sample holder is a parallel plate of 25 mm diameter. The sample was compression molded with diameter of 25 mm and thickness of 2 mm at 230° C. An oscillatory frequency sweep is used to obtain storage modulus (G'), loss modulus (G") at 190° C. under nitrogen atmosphere. The crossover of G' and G" at 190° C., Gc, is used to calculate the polydispersity (PDI) using the following equation:

$$PDI = 10^5/Gc$$

The test method is also generally described in U.S. Pat. No. 9,045,570, which employs a different sample size and cone-plate rheometry.

IZOD impact strength is measured in accordance with ASTM D 256 and D4101.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polypropylene composition having a unique blend of physical properties. For instance, in one embodiment, the polymer composition can be formulated so as to have relatively high stiffness properties in combination with excellent toughness properties. In addition, the polymer composition can be formulated to have good flow characteristics. Thus, the polymer composition is particularly well suited to form thermoformed products and molded articles, such as injection molded articles. In one embodiment, for instance, the polymer composition can be used to form containers. Due to the stiffness and toughness properties of the polymer composition, containers and other articles having an interior volume can be formed with minimal wall thickness. In this manner, polymer articles can be formed efficiently using minimal amounts of the polymer composition.

Of particular advantage, the polypropylene polymer composition of the present disclosure can be formulated with high stiffness properties while also having a broad molecular weight distribution and using a catalyst system that maintains high catalyst activity during the polymerization process. For example, during polymerization of the polymers of the present disclosure, a non-phthalate, Ziegler-Natta catalyst can be used that maintains an activity of greater than about 50 kg/g, such as greater than about 55 kg/g, such as greater than about 60 kg/g during production of the polymer composition.

In general, the polypropylene polymer composition of the present disclosure includes a blend of polymers. More particularly, the polymer composition includes a first polypropylene polymer combined with a second polypropylene polymer. The first polypropylene polymer generally has a relatively low melt flow rate in comparison to the second polypropylene polymer. It was unexpectedly discovered that relatively small amounts of the low melt flow rate polymer are needed in combination with the second polypropylene polymer to obtain a polymer composition having the desired high stiffness properties. In fact, the low melt flow rate polypropylene polymer may be present in the composition in amounts less than 50% by weight, such as in amounts less than 40% by weight, such as in amounts less than 30% by weight, such as in amounts less than 20% by weight and still provide an overall polymer composition having excellent stiffness characteristics. These results are dramatic and unexpected.

In addition, as described above, the polypropylene polymer composition can be produced having a relatively broad molecular weight distribution. The broad molecular weight distribution significantly improves the processability of the composition.

Further, the xylene soluble content of the first and second polypropylene polymers are selectively controlled so as to maintain high catalyst activity during production of the polymers while also maximizing stiffness. For instance, the resulting polymer composition can exhibit a flexural modulus according to the following equation:

$$2072 - XS^{-0.18}$$

wherein XS is the xylene soluble content of the polypropylene polymer composition. The xylene soluble content of the polypropylene polymer composition, for example, can be from about 2.5% to about 8% by weight.

For example, in one embodiment, the polypropylene polymer composition of the present disclosure can have a flexural modulus of greater than about 1500 MPa, such as greater than about 1550 MPa, such as greater than about 1600 MPa, such as greater than about 1650 MPa, such as greater than about 1700 MPa, such as greater than about 1750 MPa, and generally less than about 2500 MPa, such as less than about 2000 MPa. For example, in one embodiment, the polypropylene polymer composition can have a flexural modulus of greater than about 1525 MPa and less than about 2000 MPa, including all increments of 25 MPa therebetween.

In addition to excellent stiffness properties, the polypropylene polymer composition of the present disclosure also has excellent toughness characteristics. For instance, the polypropylene polymer composition of the present disclosure can have an IZOD impact strength of greater than about 40 J/m, such as greater than about 50 J/m, such as greater than about 55 J/m, such as greater than about 60 J/m, such as greater than about 65 J/m. The IZOD impact resistance strength is generally less than about 90 J/m, such as less than about 80 J/m.

As described above, the polypropylene polymer composition of the present disclosure includes a first polypropylene polymer blended with a second polypropylene polymer. The first polypropylene polymer generally has a low melt flow rate and contributes significantly to the stiffness properties of the resulting composition. The first polypropylene polymer, for instance, can have a melt flow rate of less than about 3 g/10 min, such as less than about 1 g/10 min, such as less than about 0.8 g/10 min, such as less than about 0.5 g/10 min, and generally greater than about 0.01 g/10 min, such as greater than about 0.1 g/10 min. Although having a low melt flow rate, the first polypropylene polymer generally has a xylene soluble content of greater than about 2.5% by weight, such as greater than about 3% by weight, such as greater than about 3.5% by weight, such as greater than about 4% by weight, such as greater than about 4.5% by weight, and generally less than about 8% by weight, such as less than about 7% by weight. The first polypropylene polymer can be formed using a Ziegler-Natta catalyst and can have a relatively broad molecular weight distribution. In one embodiment, the first polypropylene polymer has a polydispersity index of greater than about 4, and generally less than about 10, such as less than about 8.5, such as less than about 7, such as less than about 5.5.

The second polypropylene polymer combined with the first polypropylene polymer generally has a higher melt flow rate. For instance, the second polypropylene polymer can have a melt flow rate of generally greater than about 5 g/10 min, such as greater than about 7 g/10 min, such as greater than about 9 g/10 min. The melt flow rate is generally less than about 100 g/10 min, such as less than about 40 g/10 min, such as less than about 30 g/10 min, such as less than about 25 g/10 min. The xylene soluble content of the second polypropylene polymer is similar to the xylene soluble content of the first polypropylene polymer. For example, the xylene soluble content of the second polypropylene polymer is generally greater than about 1% by weight, such as greater than about 2% by weight, such as greater than about 2.5% by weight, such as greater than about 3% by weight, such as greater than about 4% by weight. In certain embodiments, the xylene soluble content of the second polypropylene polymer can be greater than about 5% by weight, such as greater than about 6% by weight, such as greater than about 6.5% by weight. The xylene soluble content of the second polypropylene polymer is generally less than about 10% by weight, such as less than about 9% by weight, such as less than about 8% by weight, such as less than about 7.5% by weight.

The second polypropylene polymer can also be formed using a Ziegler-Natta catalyst that maintains high catalyst activity during polymerization. The second polypropylene polymer can have a relatively broad molecular weight distribution and can have a polydispersity index of greater than about 4, and generally less than about 10, such as less than about 8.5, such as less than about 7, such as less than about 5.5.

The first polypropylene polymer and the second polypropylene polymer can, in one embodiment, both be polypropylene homopolymers. In an alternative embodiment, one of the polypropylene polymers can be a copolymer. For instance, the first polypropylene polymer can be a homopolymer, while the second polypropylene polymer can be a copolymer. Alternatively, the first polypropylene polymer can be a copolymer and the second polypropylene polymer can be a homopolymer. In still another embodiment, both the first and second polypropylene polymers are copolymers. When present as a copolymer, one or both of the polypropylene polymers can include minor amounts of a comonomer, such as ethylene. For instance, ethylene can be present in amounts less than about 1.5% by weight, such as in amounts less than about 1% by weight. The copolymer can be a random copolymer such as a mini-random copolymer.

In accordance with the present disclosure, the first polypropylene polymer is blended with the second polypropylene polymer to produce the polypropylene polymer composition. The weight ratio between the first polypropylene polymer and the second polypropylene polymer in the final composition is generally from about 5:95 to about 80:20, such as from about 30:70 to about 67:33. In one embodiment, the first polypropylene polymer or the low melt flow rate polypropylene polymer can be present in amounts less than the second polypropylene polymer and yet still have the desired stiffness characteristics. For instance, based on the weight of the two polypropylene polymers present, the first polypropylene polymer can be present in an amount less than about 50% by weight, such as in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, and generally in an amount greater than about 5% by weight, such as in an amount greater than about 10% by weight, such as in an amount greater than about 15% by weight, such as in an amount greater than about 20% by weight. In one aspect, the first polypropylene polymer is present in the polymer composition in an amount from about 30% by weight to about 66% by weight, such as from about 30% to about 50% by weight, such as from about 30% to about 45% by weight.

The resulting polypropylene polymer composition not only has good stiffness properties but also is well suited for thermoformable processes and molding processes, such as injection molding processes, for producing various articles especially due to the broad molecular weight distribution. For instance, the composition can have a melt flow rate of greater than about 0.5 g/10 min, such as greater than about 0.7 g/10 min, such as greater than about 1 g/10 min, such as greater than about 2 g/10 min, such as greater than about 3 g/10 min, such as greater than about 5 g/10 min, such as greater than about 8 g/10 min, such as greater than about 10 g/10 min, such as greater than about 12 g/10 min, such as greater than about 15 g/10 min. The melt flow rate is generally less than about 30 g/10 min, such as less than about 25 g/10 min, such as less than about 20 g/10 min. In one embodiment, the melt flow rate of the polypropylene composition can be relatively low and can be from about 0.5 g/10 min to about 3 g/10 min. Alternatively, the melt flow rate can be higher and can generally be from about 5 g/10 min to about 20 g/10 min. The melt flow rate can be adjusted by adjusting the relative amounts of the different polymers to produce a polymer composition having the desired physical properties in conjunction with the desired flow properties.

The total xylene soluble content of the polypropylene polymer composition is generally greater than about 2% by weight, such as greater than about 2.5% by weight, such as greater than about 3% by weight, such as greater than about 3.5% by weight. The total xylene soluble content is generally less than about 10% by weight, such as less than about 8% by weight, such as less than about 7% by weight, such as less than about 6.8% by weight. The polydispersity index of the polymer composition is generally greater than about 4, such as greater than about 5, such as greater than about 6, and generally less than about 10, such as less than about 9, such as less than about 8.

In addition to the first polypropylene polymer and the second polypropylene polymer, the polypropylene polymer composition of the present disclosure can contain various other additives and ingredients.

For instance, the polypropylene composition can contain nucleators, mold release agents, slip agents, antiblocks, UV stabilizers, heat stabilizer (e.g. DSTDP), colorants/tints, and the like. In one embodiment, the polymer composition can contain an antioxidant, such as a hindered phenolic antioxidant. The polymer composition can also contain an acid scavenger. Each of the additives can be present in the polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

For example, in one embodiment, the polymer composition can optionally contain a nucleating agent, such as an alpha-nucleating agent. The nucleating agent can generally be present in an amount greater than about 0.001% by weight and generally in an amount less than about 1% by weight, such as in an amount less than about 0.5% by weight, such as in an amount less than about 0.3% by weight.

In one embodiment, an inorganic nucleating agent may be used, such as talc. Other nucleating agents include sodium benzoate or a polymeric nucleating agent such as a partial metal salt of a rosinic acid.

In another embodiment, the nucleating agent may be selected from the group of phosphorous based nucleating agents like phosphoric acid esters metal salts represented by the following formula.

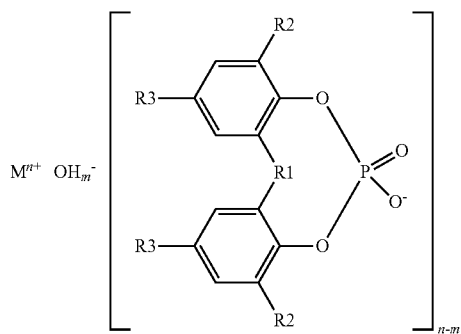

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-t-butyl-phenyl)phosphate, sodium-2,2'-ethylidene-bis(4,6-di-t-butylphenyl)-phos-phate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phos-phate, lithium-2,2'-methylene-bis(4-ethyl-6-t-butylphenyl)phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phos-phate, calcium-bis[2,2'-methylene-bis(4,6-di-t-butylphenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methylene-bis(4-ethyl-6-t-butylphenyl)phos-phate, sodium(4,4'-dimethyl-5,6'-di-t-butyl-2,2'-biphenyl)phosphate, calcium-bis-[(4,4'-dimethyl-6,6'-di-t-butyl-2,2'-biphenyl)phosphate], sodium-2,2'-ethyli-dene-bis(4-m-butyl-6-t-butyl-phenyl)phosphate, sodium-2,2'-methylene-bis-(4,6-di-methylphenyl)-phos-phate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phos-phate], magnesium-bis[2,2'-ethyli-dene-bis(4,6-di-t-butylphenyl)-phosphate], barium-bis[2,2'-ethylidene-bis-(4,6-di-t-butylphenyl)-phosphate], aluminium-hydroxy-bis[2,2'-methylene-bis(4,6-di-t-butyl-phenyl)phosphate], aluminium-tris[2,2'-ethylidene-bis(4,6-di-t-butylphenyl)-phosphate].

A second group of phosphorous based nucleating agents includes for example aluminium-hydroxy-bis[2,4,8,10-tet-rakis(1,1-dimethylethyl)-6-hydroxy-12H-dibenzo-[d,g]-di-oxa-phoshocin-6-oxidato] and blends thereof with Li-myristate or Li-stearate.

Of the phosphorous based nucleating agents sodium-2,2'-methylene-bis(4,6-di-t-butylphenyl)phosphate or aluminium-hydroxy-bis[2,2'-methy-lene-bis(4,6-di-t-butylphenyl)-phosphate] or aluminium-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also sorbitol-based nucleating agents, like optionally substituted dibenzylidine sorbitol (e.g. 1,3:2,4 Dibenzylidene sorbitol, 1,3:2,4 Di(methylbenzylidene) sorbitol 1,3:2,4 Di(ethylbenzylidene) sorbitol, 1,3:2,4 Bis(3,4-dimethylbenzylidene) sorbitol, etc.) or pine rosin can be used as nucleating agents.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerized with monomers like e.g. vinylcyclohexane (VCH), or by blending the propylene polymer with the vinyl(cyclo)alkane polymer.

Nucleating agents such as ADK NA-11 (Methylen-bis(4, 6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are commercially available from Asahi Denka Kokai and are among those which may be added to the polyolefin composition. Millad NX8000 (nonitol, 1,2,3-trideoxy-4,6:5,7-bis-O-[(4-propylphenyl)methylene)],
Millad 3988 (3,4-Dimethylbenzylidene sorbitol), Millad 3905 and Millad 3940 available from Milliken & Company are other examples of nucleating agents that can be utilized.

Further commercial available alpha-nucleating agents, which can be used for the composition are, for example, Irgaclear XT 386 (N-[3,5-bis-(2,2-dimethyl-propionylamino)-phenyl]-2,2-dimethylpropionamide) from Ciba Specialty Chemicals, Hyperform HPN-68L and Hyperform HPN-20E from Milliken & Company.

According to an embodiment, the at least one alpha-nucleating agent is comprised of a polymeric nucleating agent selected from the group consisting of vinylcycloalkane polymers and vinylalkane polymers, preferably poly-vinyl-cyclohexane (pVCH).

According to a further embodiment, the at least one alpha-nucleating agent is selected from the group consisting of aluminium hydroxy-bis[2,4,8,10-tetrakis(1,1-dimethylethyl)-6-hydroxy-12H-dibenzo-[d,g]-dioxa-phoshocin-6-oxidato] based nucleating agents (e.g. ADK NA-21, NA-21 E, NA-21 F), sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate] and sorbitol-based nucleating agents (e.g. Millad 3988, Millad 3905 and Millad 3940).

In one embodiment, the polypropylene composition can further contain a clarifying agent. The clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in Formula (I):

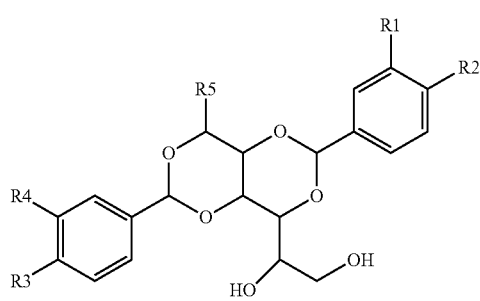

(I)

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of clarifying agents that may be used include:
1,3:2,4-dibenzylidenesorbitol
1,3:2,4-bis(p-methylbenzylidene)sorbitol
Di(p-methylbenzylidene)Sorbitol
Di(p-ethylbenzylidene)Sorbitol
Bis(5',6',7',8'-tetrahydro-2-naphtylidene)Sorbitol In one embodiment, the clarifying agent may also comprise a bisamide, such as benzenetrisamide. The clarifying agents described above can be used alone or in combination.

When present in the polymer composition, one or more clarifying agents are generally added in an amount greater than about 200 ppm, such as in an amount greater than about 1,800 ppm, such as in an amount greater than about 2,000 ppm, such as in an amount greater than about 2,200 ppm. One or more clarifying agents are generally present in an amount less than about 20,000 ppm, such as less than about 15,000 ppm, such as less than about 10,000 ppm, such as less than about 8,000 ppm, such as less than about 5,000 ppm. The amount of clarifying agent present in the composition can depend upon various factors including the type of clarifier that is used.

The first polypropylene polymer and the second polypropylene polymer can be produced using various different polymerization methods and procedures. In one embodiment, both of the polymers are formed from a propylene monomer in the presence of a Ziegler-Natta catalyst. For example, the olefin polymerization can occur in the presence of a catalyst system that includes a catalyst, an internal electron donor, a cocatalyst, and optionally an external electron donor and/or an activity limiting agent. The polymerization process used to produce the two polymers can be carried out using known techniques. For instance, the polymers can be formed in a gas phase reactor or a bulk phase reactor. In particular, the polymers can be formed in a gas phase reactor using a fluidized bed or stirred bed reactor or in a slurry phase using an inert hydrocarbon solvent or diluent or liquid monomer. For instance, the first polypropylene polymer and the second polypropylene polymer can both be formed in a gas phase reactor. Alternatively, first polypropylene polymer and the second polypropylene polymer can both be formed in a bulk (liquid propylene) phase reactor. In a further embodiment, one of the first polypropylene polymer and the second polypropylene polymer is formed in a gas phase reactor and the other of the first polypropylene polymer and the second polypropylene polymer is formed in a bulk phase reactor. For instance, the first polypropylene polymer may be formed in a bulk phase reactor and the second polypropylene polymer may be formed in a gas phase reactor.

In one embodiment, the first polypropylene polymer and the second polypropylene polymer are produced in two different polymerization processes and then combined together. Alternatively, the first polypropylene polymer and the second polypropylene polymer can be produced sequentially in a process that includes a series of reactors. For example, one of the polypropylene polymers can be produced in a first reactor and then conveyed to a second reactor where the other polypropylene polymer is produced.

In one embodiment of the present disclosure, the polymerizations are carried out in the presence of a stereoregular olefin polymerization catalyst. For example, the catalyst may be a Ziegler-Natta catalyst. For instance, in one embodiment, a catalyst sold under the trade name CONSISTA and commercially available from W. R. Grace & Company can be used. In one embodiment, electron donors are selected that do not contain phthalates.

In one embodiment, the catalyst includes a procatalyst composition that contains a titanium moiety such as titanium chloride, a magnesium moiety such as magnesium chloride, and at least one internal electron donor.

The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In one embodiment, the procatalyst precursor contains magnesium as the sole metal component. Non-limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In one embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical $MgCl_2$-nEtOH adduct may be formed by a spray crystallization process. In one, embodiment the spherical $MgCl_2$ precursor has an average particle size (Malvern $d_{50}$) of between about 15-150 microns, preferably between 20-100 microns, and most preferably between 35-85 microns.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof In one embodiment, the precursor composition is a mixed magnesium/titanium compound of the formula $Mg_d Ti(OR^e)_f X_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3.

In accordance with the present disclosure, the above described procatalyst precursor is combined with at least one internal electron donor. The internal electron donor can comprise a substituted phenylene aromatic diester.

In one embodiment, the first internal electron donor comprises a substituted phenylene aromatic diester having the following structure (I):

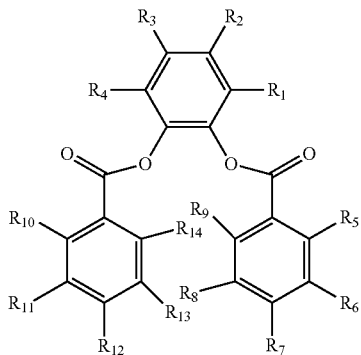

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Ser. No. 61/141,959 filed on Dec. 31, 2008, the entire content of which is incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a $C_5$ or a $C_6$ membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a $C_5$-$C_6$-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a $C_1$-$C_6$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

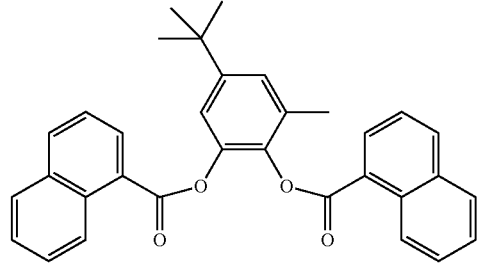 [SMILES: Cc1cc(C(C)(C)C)cc(OC(=O)c2cccc3ccccc23)c1OC(=O)c1cccc2ccccc12]

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

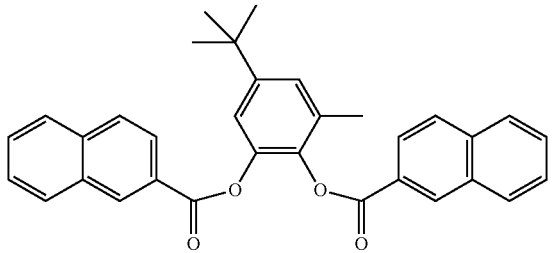 [SMILES: Cc1cc(C(C)(C)C)cc(OC(=O)c2ccc3ccccc3c2)c1OC(=O)c1ccc2ccccc2c1]

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In one embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In one embodiment, structure (I) includes $R_1$ that is a methyl group and $R_3$ is a t-butyl group. Each of $R_2$, $R_4$ and $R_5$-$R_{14}$ is a fluorine atom.

In one embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$ and $R_{14}$ is hydrogen.

In one embodiment, $R_1$ is a methyl group and $R_3$ is a t-butyl group. Each of Rand Rue is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In one embodiment, structure (I) includes $R_1$ and $R_3$, each of which is a sec-butyl group. Each of $R_2$, $R_4$ and $R_5$-$R_{14}$ is hydrogen.

In one embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

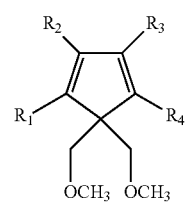

In one embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

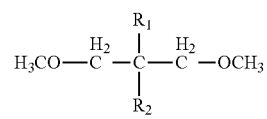

In one embodiment, structure (I) includes $R_1$ and $R_4$ that are each a methyl group. Each of $R_2$, $R_3$, $R_5$-$R_9$ and $R_{10}$-$R_{14}$ is hydrogen.

In one embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In one embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In one embodiment, each of $R_1$ and $R_4$ is selected from a methyl group, an ethyl group, and a vinyl group. Each of $R_2$ and $R_3$ is selected from hydrogen, a secondary alkyl group, or a tertiary alkyl group, with $R_2$ and $R_3$ not concurrently being hydrogen. Stated differently, when $R_2$ is hydrogen, $R_3$ is not hydrogen (and vice versa).

In one embodiment, a second internal electron donor may be used that generally comprises a polyether that can coordinate in bidentate fashion. In one embodiment the second internal electron donor is a substituted 1,3-diether of structure VI:

$$H_3CO-\underset{}{\overset{H_2}{C}}-\underset{R_2}{\overset{R_1}{C}}-\overset{H_2}{C}-OCH_3$$

Where $R_1$ and $R_2$ are the same or different, methyl, $C_2$-$C_{18}$ linear or branched alkyls, $C_3$-$C_{18}$ cycloalkyl, $C_4$-$C_{18}$ cycloalkyl-alkyl, $C_4$-$C_{18}$ alkyl-cycloalkyl, phenyl, organosilicon, $C_7$-$C_{18}$ arylalkyl, or $C_7$-$C_{18}$ alkylaryl radicals; and $R_1$ or $R_2$ may also be a hydrogen atom.

In one embodiment the second internal electron donor may comprise a 1,3-diether with cyclic or polycyclic structure VII:

[Structure VII: cyclopentadiene with $R_1$, $R_2$, $R_3$, $R_4$ substituents and two OCH$_3$ groups]

Where $R_1$, $R_2$, $R_3$, and $R_4$ are as described for $R_1$ and $R_2$ of structure VI or may be combined to form one or more $C_5$-$C_7$ fused aromatic or non-aromatic ring structures, optionally containing an N,O, or S heteroatom. Particular examples of the second internal electron donor include 4,4-bis(methoxymethyl)-2,6-dimethyl heptane, 9,9-bis(methoxymethyl)fluorene, or mixtures thereof.

The precursor is converted to a solid procatalyst by further reaction (halogenation) with an inorganic halide compound, preferably a titanium halide compound, and incorporation of the internal electron donors.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The internal electron donor can be present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donor is generally present in an amount greater than about 5% by weight, such as in an amount greater than about 9% by weight.

In one embodiment, the procatalyst composition is combined with a cocatalyst to form a catalyst system. A catalyst system is a system that forms an olefin-based polymer when contacted with an olefin under polymerization conditions. The catalyst system may optionally include an external electron donor, an activity limiting agent, and/or various other components.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$(I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C3_{-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane (DCPDMS), methylcyclohexyldimethoxysilane (MChDMS), diisopropyldimethoxysilane (DIPDMS), n-propyltrimethoxysilane (NPTMS), diethylaminotriethoxysilane (DATES), or n-propyltriethoxysilane (PTES), and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, and/or a diol ester. In another embodiment, the external electron donor is 2,2,6,6-tetramethylpiperidine. In still another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono-or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane, isopropyl myristate, pentyl valerate, and combinations thereof.

In one embodiment, the catalyst composition includes any of the foregoing external electron donors in combination with any of the foregoing activity limiting agents.

The first polypropylene polymer and the second polypropylene polymer can each be formed from a catalyst system as described above. The propylene polymers can be formed from the same non-phthalate, Ziegler-Natta catalyst system or can be made from different non-phthalate, Ziegler-Natta catalyst systems. It was discovered that by using a catalyst system as described above in conjunction with controlling the xylene soluble content of the propylene polymer, the first and second polypropylene polymers can be produced at relatively high catalyst activity while still producing a polypropylene polymer composition having excellent stiffness properties. For instance, the first and second polypropylene polymers can be produced from a catalyst system as described above during a process in which the catalyst activity is at least 50 kg/g, such as at least 55 kg/g, such as at least 60 kg/g, such as even greater than about 65 kg/g. The catalyst activity is generally less than about 100 kg/g. In accordance with the present disclosure, the two different polypropylene polymers are then combined in order to maximize stiffness properties without sacrificing toughness. Overall, a polypropylene polymer composition can be produced more efficiently than high stiffness polypropylene polymers made in the past. Further, in addition to excellent stiffness and toughness properties, the polypropylene polymer composition of the present disclosure also has excellent thermoformability characteristics and moldability characteristics and can be easily molded into various different articles and products.

For example, the polypropylene polymer composition of the present disclosure is well suited to producing molded articles. The polypropylene composition, for instance, can be used in injection molding, blow molding, extrusion, and rotational molding applications.

The polypropylene polymer composition of the present disclosure can be used to make numerous and diverse articles and products. Due to the high stiffness properties and excellent flow properties, for instance, the polypropylene polymer composition can be used to produce all different types of freestanding articles and products. The high stiffness properties allow for articles to be produced having relatively thin walls while still having desired form-retaining properties. In addition, the high stiffness and toughness properties allow for products and articles made according to the present disclosure to withstand impact forces that may occur from drops or other external events.

The polypropylene polymer composition of the present disclosure, for instance, is well suited to producing all different types of containers while minimizing wall thickness and therefore minimizing the amount of polymer needed to produce the article. Containers that may be made in accordance with the present disclosure include, for instance, storage containers, packaging containers, food containers, and the like. Other containers can include cups and other beverage or liquid holding containers.

The present disclosure may be better understood with reference to the following example.

EXAMPLE

Various different polypropylene polymer compositions were made in accordance with the present disclosure and tested for stiffness and toughness. The samples were compared to basic reactor grade polypropylene polymers.

The samples made in accordance with the present disclosure included a first polypropylene polymer combined with a second polypropylene polymer to form a polypropylene polymer composition. All of the polypropylene polymers produced were polymerized in the presence of a non-phthalate, Ziegler-Natta catalyst system as described above. In particular, the catalyst used was CONSISTA catalyst marketed by W. R. Grace & Co. The polymers were produced in a gas phase reactor. In this example, only polypropylene homopolymers were produced.

In particular, polymer pellet samples were produced that were injection molded into specimens. The specimens were made according to ASTM Test D4101 to produce specimens for testing flexural modulus and IZOD impact resistance.

The melt flow rate and xylene soluble content of each polypropylene polymer produced was measured. The following results were obtained:

| | MFR1 | XS1 | MFR2 | XS2 | MFR | weight percent of First Polypropylene Polymer | PDI | XS, % | Flex. M, MPa | IZOD, J/m |
|---|---|---|---|---|---|---|---|---|---|---|
| Comparative Sample 1 | 2.1 | 3 | — | — | 2.1 | 100 | 4.1 | 3 | 1617 | 44.0 |
| Comparative Sample 2 | 0.3 | 6.7 | — | — | 0.3 | 100 | 4.3 | 6.7 | 1436 | 87.0 |
| Comparative Sample 3 | 3 | 5.4 | | | 3 | 100 | 5 | 5.4 | 1497 | 44.5 |
| Sample 1 | 0.8 | 3.8 | 10 | 2.5 | 2.5 | 56% | 4.7 | 3.3 | 1722 | 49.0 |
| Sample 2 | 0.8 | 3.8 | 20 | 3.5 | 2.1 | 66% | 4.9 | 3.8 | 1722 | 46.9 |
| Sample 3 | 0.3 | 3.8 | 10 | 2.5 | 2.5 | 35% | 5.6 | 3.6 | 1784 | 53.0 |
| Sample 4 | 0.3 | 3.8 | 20 | 3.5 | 1.6 | 50% | 6.1 | 3.8 | 1794 | 60.9 |
| Sample 5 | 0.3 | 3.8 | 10 | 2.5 | 0.7 | 80% | 4.2 | 3 | 1652 | 70.4 |
| Sample 6 | 0.8 | 7 | 10 | 7 | 2.3 | 56% | 5.4 | 6.8 | 1497 | 54.2 |
| Sample 7 | 0.3 | 7 | 10 | 7 | 2.3 | 40% | 5.8 | 6.8 | 1540 | 64.4 |
| Sample 8 | 0.15 | 7 | 10 | 7 | 2.2 | 30% | 6.6 | 6.8 | 1585 | 60.1 |
| Sample 9 | 0.8 | 7 | 10 | 1.5 | 2.7 | 56% | 5 | 5 | 1626 | 63.7 |
| Sample 10 | 0.9 | 1.5 | 10 | 7 | 2.2 | 56% | 5.1 | 4.3 | 1665 | 58.5 |
| Sample 11 | 0.15 | 7 | 10 | 3.5 | 2 | 30% | 7.5 | 4.7 | 1725 | 50.3 |
| Sample 12 | 0.15 | 7 | 20 | 3.5 | 2 | 40% | 8.1 | 4.7 | 1757 | 50.9 |

FIG. 1 is a graphical representation of the results shown above. In particular, FIG. 1 compares the flexural modulus to the xylene soluble content of the polymers. As shown, the polymers made according to the present disclosure had dramatically better stiffness properties than the comparative samples. In one aspect, samples made according to the present disclosure can exhibit a flexural modulus according to the following equation:

$$2072 \cdot XS^{-0.18}$$

wherein the xylene soluble content varied from 3% to 6.8% by weight.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polypropylene polymer composition comprising:
   a first polypropylene polymer combined with a second polypropylene polymer, the first polypropylene polymer has a melt flow rate of from about 0.1 g/10 min to about 3 g/10 min and a xylene soluble content of from about 2.5% by weight to about 7% by weight,
   the second polypropylene polymer has a melt flow rate of from about 5 g/10 min to about 100 g/10 min and a xylene soluble content of from about 2.5% by weight to about 7% by weight; and
   wherein the polypropylene polymer composition has a flexural modulus according to the following formula:

$$FX \geq 2072 * XS^{-0.18}$$

wherein FX is flexural modulus and XS is xylene soluble content of the polypropylene polymer composition, the xylene soluble content of the polypropylene polymer composition is from about 2.5% to about 7% by weight.

2. The polypropylene polymer composition of claim 1, where one of the polypropylene polymers has a xylene soluble content of greater than 5% by weight and the other polypropylene polymer has a xylene soluble content of less than about 4% by weight.

3. The polypropylene polymer composition of claim 1, wherein the first polypropylene polymer is present in the polymer composition in an amount less than about 66% by weight, and in an amount greater than about 30%.

4. The polypropylene polymer composition of claim 1, wherein the polypropylene polymer composition contains a nucleating agent.

5. The polypropylene polymer composition of claim 1, wherein the polypropylene polymer composition does not contain a nucleating agent.

6. The polypropylene polymer composition of claim 1, wherein the polypropylene polymer composition has a melt flow rate of from about 0.5 g/10 min to about 30 g/10 min and has a xylene soluble content of from about 3% to about 7% by weight.

7. The polypropylene polymer composition of claim 1, wherein the polypropylene polymer composition has a polydispersity index of from about 5 to about 10.

8. The polypropylene polymer composition of claim 1, wherein the first polypropylene polymer has a polydispersity index of from about 4 to about 5.5 and the second polypropylene polymer has a polydispersity index of from about 4 to about 5.5.

9. The polypropylene polymer composition of claim 1, wherein a weight ratio between the first polypropylene polymer and the second polypropylene polymer is from about 5:95 to about 80:20.

10. The polypropylene polymer composition of claim 1, wherein the first polypropylene polymer and the second polypropylene polymer both comprise non-phthalate Ziegler-Natta catalyzed polypropylene polymers.

11. The polypropylene polymer composition of claim 1, wherein the polypropylene polymer composition has a flexural modulus of from about 1,500 MPa to about 2,500 MPa.

12. The polypropylene polymer composition of claim 1, wherein the polypropylene polymer composition has a melt flow rate of from about 0.5 g/10 min to about 3 g/10 min.

13. The polypropylene polymer composition of claim 12, wherein the polypropylene polymer composition has a xylene soluble content of from 3.5% by weight to 7% by weight.

14. The polypropylene polymer composition of claim 1, wherein the polypropylene polymer composition has a melt flow rate of from about 5 g/10 min to about 30 g/10 min.

15. The polypropylene polymer composition of claim 1, wherein the polypropylene polymer composition has an IZOD impact resistance of greater than about 40 J/m and less than about 90 J/m.

16. A polymer article formed from the polypropylene polymer composition of claim 1.

17. The polymer article of claim 16, wherein the polymer article comprises a storage or packaging container.

\* \* \* \* \*